US005568309A

United States Patent [19]
Rockwell

[11] Patent Number: 5,568,309
[45] Date of Patent: Oct. 22, 1996

[54] SYSTEM AND METHOD FOR AMPLIFICATION AND WAVEFRONT COMPENSATION OF DEPOLARIZED OPTICAL BEAMS

[75] Inventor: David A. Rockwell, Santa Monica, Calif.

[73] Assignee: Hughes Aircraft Company, Los Angeles, Calif.

[21] Appl. No.: 427,517

[22] Filed: Apr. 24, 1994

[51] Int. Cl.$^6$ ............................................. H01S 3/00
[52] U.S. Cl. ............................................. 359/338; 359/347
[58] Field of Search ............................... 354/337, 338, 354/347, 349

[56] References Cited

U.S. PATENT DOCUMENTS

| | | | |
|---|---|---|---|
| 5,208,699 | 5/1993 | Rockwell et al. | 359/338 |
| 5,239,408 | 8/1993 | Hackel et al. | 359/338 |
| 5,285,310 | 2/1994 | Miller et al. | 359/338 |

OTHER PUBLICATIONS

Andreev et al., "Multipass Amplifier with Full Utilization of the Active Element Aperture", *Sovient Journal of Quantum Electronics*, vol. 13, No. 5, May 1993, pp. 641–643.

Dane et al., "Long Pulse Regenerative Amplifier Architecture with Diffraction–Limited Output Divergence", Conference on Lasers and Electro–Optics, *Optical Society of America Technical Digest Series*, vol. 11, May 1993, pp. 274–275.

Brodov et al., "Eight–Pass Neodynium Glass Slab Amplifier with a Waveguide and with Phase Conjugation", *Soviet Journal of Quantum Electronics*, vol. 17, No. 10, Oct. 1987, pp. 1265–1266.

Eggleston et al., "Slab–Geometry Nd:glass Laser Performance Studies", *Optics Letters*, vol. 7, No. 9, May 1982, pp. 405–407.

Belan et al., "Stimulated Brillouin Scattering Mirrors made of Capillary Waveguides", *Soviet Jouranl of Quantum Electronics*, vol. 17, No. 1, Jan. 1987, pp. 122–124.

Basov et al., "Inversion of Wavefront in SMBS of a Depolarized Pump", *JETP Letters*, vol. 28, No. 4, Aug. 1978, pp. 197–201.

Andreev et al., "Locked Phase Conjugation for Twp–Beam Coupling of Pulse Repetition Rate Solid State Lasers", *IEEE Journal of Quantum Electronics*, vol. 27, No. 1, Jan. 1991, pp. 135–141.

*Primary Examiner*—Mark Hellner
*Attorney, Agent, or Firm*—V. D. Duraiswamy; W. K. Denson-Low

[57] ABSTRACT

An optical amplification system and method that allows an optical seed beam to pass through an optical amplifier more than two times, even when the seed beam is highly depolarized. This is accomplished by using a polarizing beamsplitter that separates a highly depolarized seed beam into two diverging orthogonally polarized beams. The orthogonally polarized beams perform a first pass through the amplifier and are re-directed back into the amplifier so that each beam makes a second pass through the amplifier by propagating back along the other beam's first path. Because of the path exchange, the two orthogonally polarized beams diverge from each other when they pass back through the polarizing beamsplitter. The diverging beams are phase conjugated and retrace their respective paths through the system so that each beam performs a third and fourth pass through the amplifier. After the fourth pass, the orthogonally polarized beams are recombined into a single depolarized return beam by the polarizing beamsplitter. A high power phase conjugate laser system that utilizes the above described amplifier system is also provided.

31 Claims, 3 Drawing Sheets

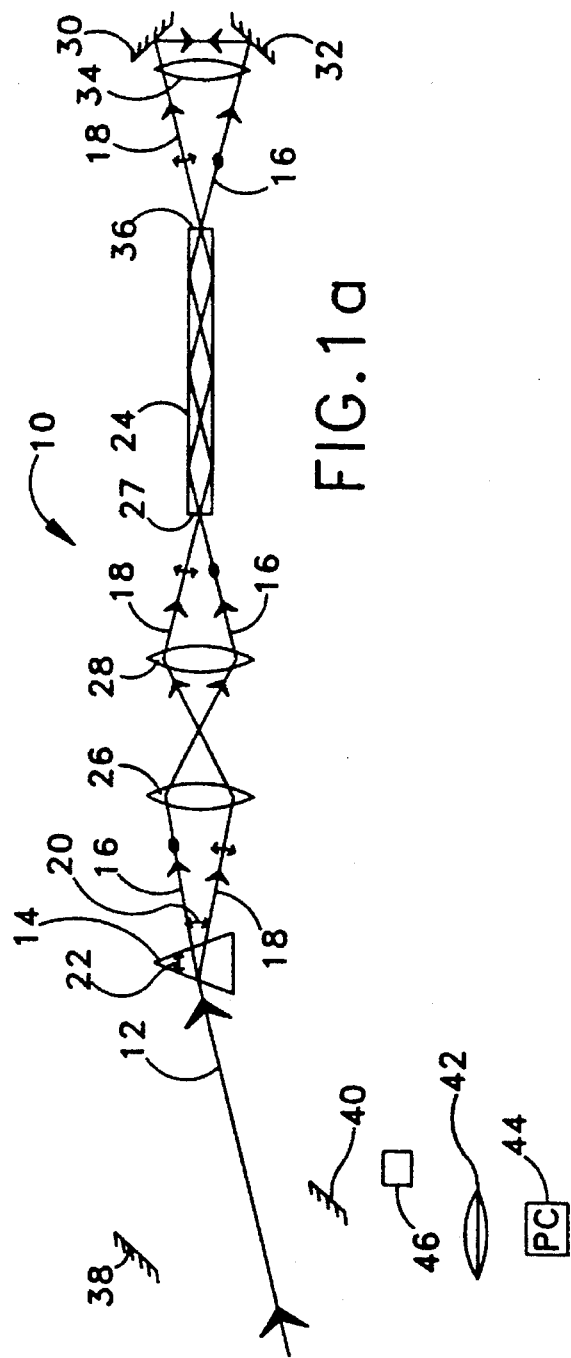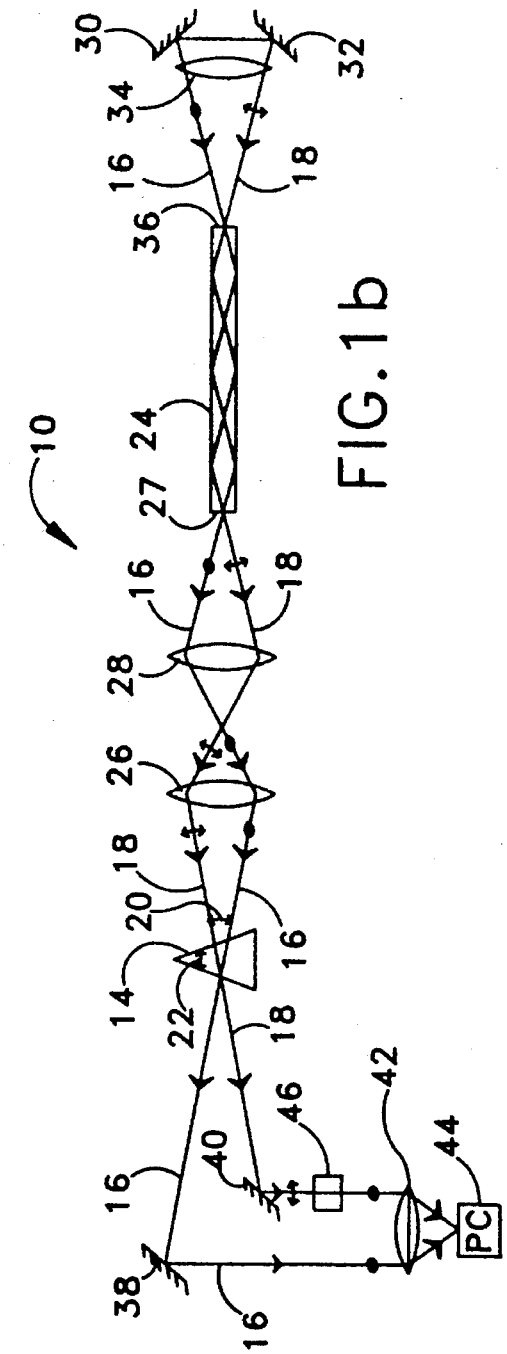

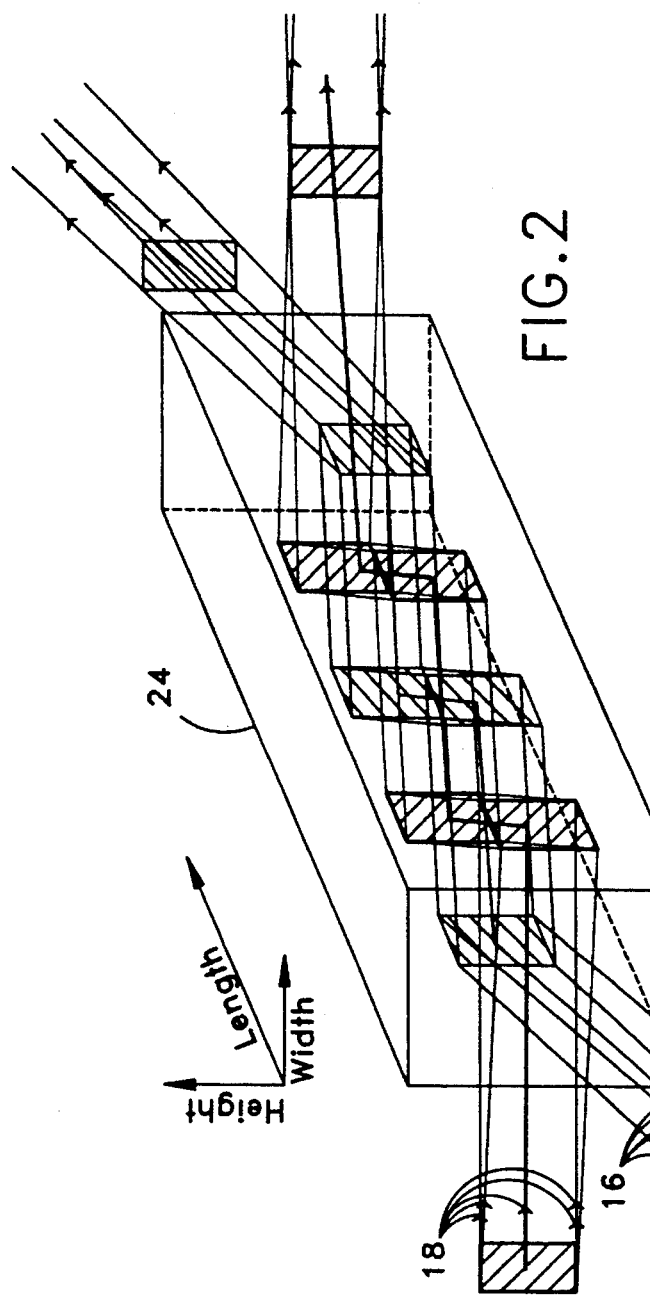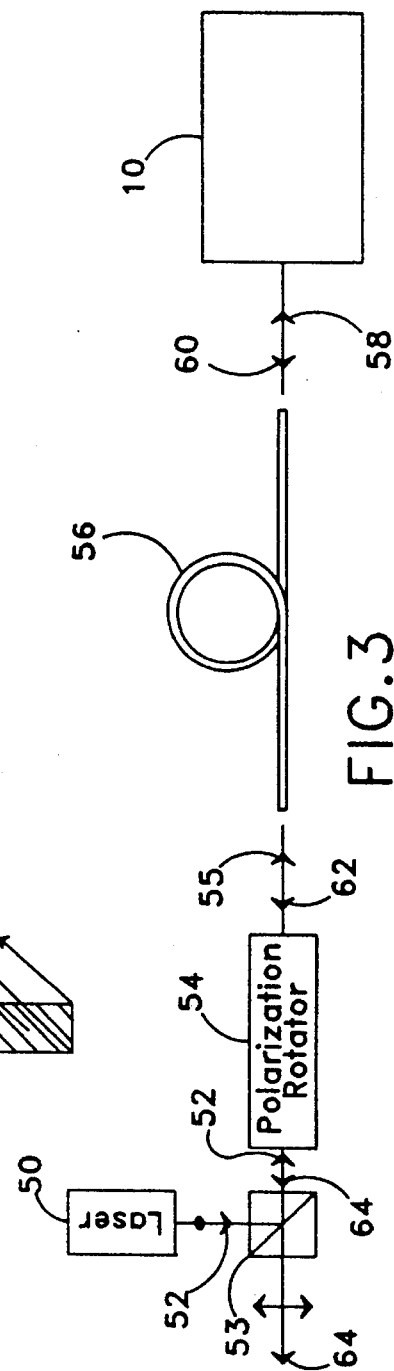

SYSTEM AND METHOD FOR AMPLIFICATION AND WAVEFRONT COMPENSATION OF DEPOLARIZED OPTICAL BEAMS

BACKGROUND OF THE INVENTION

1. Field of the Invention

This invention relates to optical beam amplification and more specifically to amplification and wavefront compensation of depolarized optical beams.

2. Description of the Related Art

A double-pass master-oscillator power amplifier (MOPA) used in conjunction with a phase conjugator (for wavefront compensation) is a well known approach for amplifying an optical beam from a low-power, diffraction-limited laser, while maintaining the beam's diffraction-limited divergence and linear polarization. In a double-pass MOPA, an optical seed beam from a diffraction-limited master oscillator, such as a solid-state laser, is passed through an amplifying medium twice.

Some of the amplifiers used in MOPAs are low-gain amplifiers due to the use of an inherently low-gain material (such as Nd:glass) as the gain medium. Even when a higher gain medium is used, such as neodymium-doped yttrium aluminum garnet (Nd:YAG), the possibility of thermal fracture due to overheating limits the pumping rate, and hence the gain, to low values. The double-pass architecture is not practical for use in conjunction with low-gain amplifiers because two passes through a low-gain amplifier will only amplify the beam by a relatively small amount, resulting in low amplifier extraction efficiency.

Higher amplifier extraction efficiencies can be achieved with low-gain amplifiers by increasing the number of passes that the optical seed beam makes through the amplifier. A four-pass architecture is described in N. F. Andreev, et al., "Multipass Amplifier with Full Utilization of the Active Element Aperture", *Soviet Journal of Quantum Electronics*, vol. 13, no. 5, May 1993, pages 641–643. Eight-pass architectures are described in C. B. Dane, et al., "Long Pulse Regenerative Amplifier Architecture with Diffraction-Limited Output Divergence", Conference on Lasers and Electro-Optics, *Optical Society of America Technical Digest Series*, vol. 11, May 1993, pages 274–275, and also in M. E. Brodov, et al., "Eight-Pass Neodynium Glass Slab Amplifier with a Waveguide and with Phase Conjugation", *Soviet Journal of Quantum Electronics*, vol. 17, no. 10, October 1987, pages 1265–1266. In both of these architectures, as well as other multi-pass architectures, the optical techniques used to couple the seed beam in and out of the amplifier chain require a linearly polarized seed beam.

There are applications in which it is desirable to amplify a depolarized seed beam. For example, laser-based avionic systems typically require high power diffraction-limited laser beams. When installing a high power laser system in an aircraft, it is often desirable to locate the emitting aperture near the nose of the aircraft or out on a wing. Using traditional lasers, system designers were forced to locate the entire laser system at the desired location, creating weight and volume distribution problems. One way to overcome this problem is to use multimode optical fibers to deliver the high power beam to the desired emitting aperture.

The high power beam can be obtained by amplifying a diffraction-limited seed beam with a MOPA, using a system similar to that described in U.S. Pat. No. 5,208,699, entitled "COMPENSATED, SBS-FREE OPTICAL BEAM AMPLIFICATION AND DELIVERY APPARATUS AND METHOD", issued May 4, 1993 to David A. Rockwell and John L. Bartelt and assigned to Hughes Aircraft Company, the assignee of the present invention. In this type of system the seed beam laser, the optical amplifier and a phase conjugator are located at a central station. The low-power seed beam is delivered to a local station, such as an emitting aperture located at the nose of an aircraft, through a single-mode, polarization preserving reference optical fiber. The seed beam is transmitted back through an optical fiber bundle to the central station for amplification and phase conjugation, and the amplified, phase conjugated beam is delivered back to the local station through the fiber bundle.

The fiber bundle used to deliver the seed beam to the central station and the amplified beam back to the local station must be multi-mode to accommodate the high-power amplified beam. The multi-mode fiber bundle depolarizes and aberrates the seed beam on its way from the local station to the optical amplifier. Since the amplified seed beam is phase conjugated by a phase conjugator, the depolarization and aberrations imposed on the beam by the multi-mode fiber are compensated when the phase conjugated, amplified beam passes back through the fiber bundle on its way back to the local station. However, the depolarization of the seed beam limits the number of passes through the optical amplifier to only two. This is because the depolarization of the beam is not compensated until after the amplified beam is returned to the local station through the fiber bundle. Since the beam is depolarized while it is at the central station, current four and eight-pass MOPA architectures cannot be used.

SUMMARY OF THE INVENTION

In view of the above problems, the present invention provides an optical amplification system and method that allows an optical seed beam to pass through an amplifier more than two times, even when the seed beam is highly depolarized.

This is accomplished by separating a highly depolarized seed beam into two orthogonally polarized beams that diverge from each other. At least one beam director is used to redirect the beams into the amplifier so that they perform a first set of multiple passes through the amplifier. After the first set of multiple passes, the beams are phase conjugated so that they retrace their paths through the amplifier. As a result, the beams perform a second set of multiple passes through the amplifier and are recombined into a single return beam.

In the preferred embodiment, each of the orthogonally polarized beams performs a first pass through the amplifier (each beam having its own path) and is re-directed back into the amplifier by a beam director such that the two beams exchange paths (i.e., each beam makes a second pass through the amplifier along the other beam's first path). To clarify the nature of this path exchange, assume the polarization states of the two initial beams derived from the highly depolarized seed beam are oriented along axes defined as $\hat{x}$ and $\hat{y}$, respectively. After the second pass through the amplifier, the $\hat{y}$-polarized beam propagates back along the path initially followed by the $\hat{y}$-polarized beam. Similarly, the $\hat{y}$-polarized beam propagates back along the path initially followed by the $\hat{x}$-polarized beam. Because of this path exchange, the two orthogonally polarized beams diverge from each other when they pass back through the polarizing beamsplitter.

The diverging beams are then phase conjugated and retrace their respective paths through the system so that each beam performs a third and fourth pass through the amplifier. After the fourth pass, the orthogonally polarized beams are polarized along the same axes as when they were initially created, and they are recombined into a single return beam.

A high-power phase-conjugate laser system that utilizes the amplifier system described above is also provided. A linearly polarized diffraction-limited seed beam is produced by a master oscillator, such as a solid-state laser. The seed beam is delivered to the amplifier system through a depolarizing multi-mode optical fiber. The depolarized beam makes four passes through the amplifier, and is phase conjugated after the second pass as described above. The recombined, amplified return beam passes back through the multi-mode fiber and is coupled out of the system. Since the amplified return beam is also phase conjugated, the aberrations and depolarization imparted on the beam by the multi-mode fiber are compensated when the return beam passes back through the fiber. As a result, the final amplified beam that is coupled out of the system is diffraction-limited and linearly polarized (like the seed beam).

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a–1d are plan view schematic diagrams illustrating the optical amplifier system of the present invention in operation during first, second, third and fourth seed beam passes through an optical amplifier, respectively.

FIG. 2 is a perspective view of a preferred optical amplifier geometry for use in the systems of FIGS. 1a–1d and FIG. 3.

FIG. 3 is a schematic view of a high power phase conjugate laser system utilizing the amplifier system of FIGS. 1a–1d.

DETAILED DESCRIPTION OF THE INVENTION

Figure 1C:
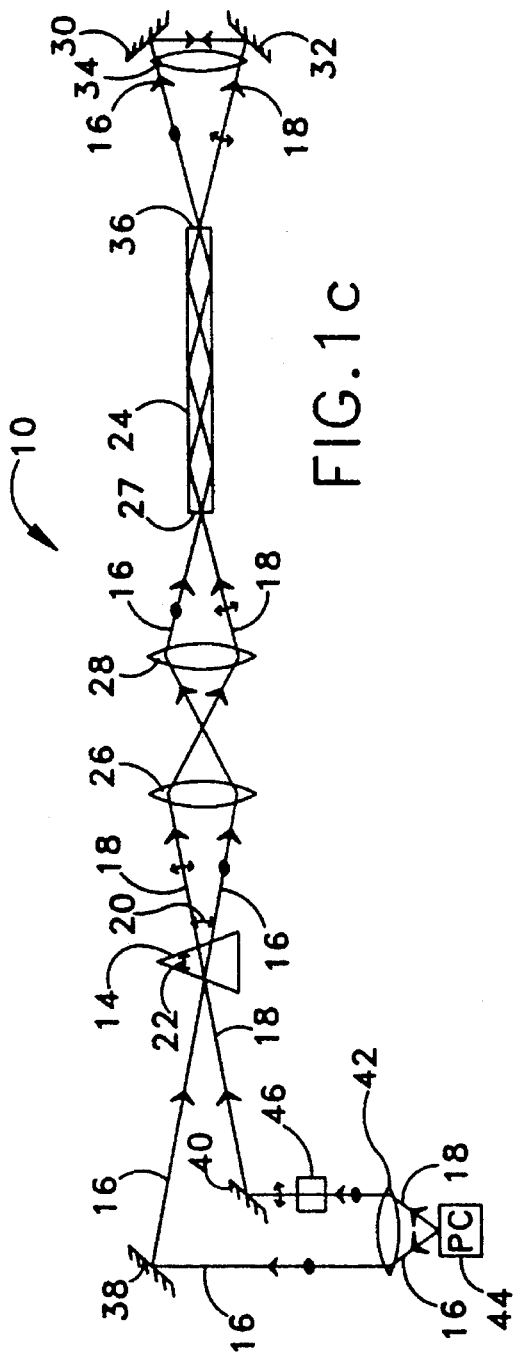
Figure 1D:
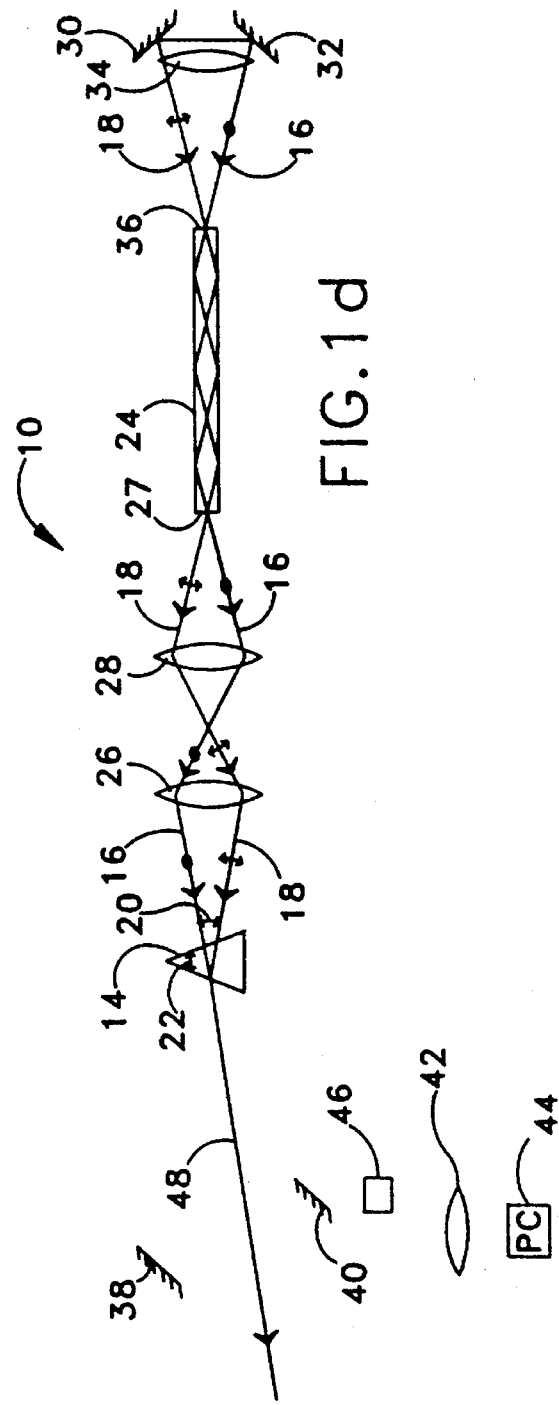

FIGS. 1a–1d illustrate the present optical amplifier system 10 in operation during first and second sets of multiple seed beam passes through an amplifier. In the preferred embodiment, the first set of multiple passes comprise first and second passes through the amplifier 24 (illustrated in FIGS. 1a and 1b, respectively) and the second set of multiple passes comprise third and fourth passes (illustrated by FIGS. 1c and 1d, respectively).

During the first pass (FIG. 1a), a depolarized beam 12 is directed to a polarizing beamsplitter, preferably a wedge 14 made of birefringent material (such as calcite). The wedge 14 splits the depolarized beam 12 into two orthogonally polarized beams 16 and 18. For illustration, beam 16 is assumed to be polarized in a direction perpendicular to the plane of the page (vertically polarized, as indicated by a dark spot on beam 16) and beam 18 is assumed to be polarized in a direction parallel to the plane of the page (horizontally polarized, as indicated by a double arrow on beam 18). The wedge 14 causes the orthogonally polarized beams 16 and 18 to diverge from each other. The divergence angle 20 is determined by the wedge angle 22, the orientation of the crystal axes within the wedge, and the difference in refractive indices for ordinary "o" and extraordinary "e" light rays in the wedge material.

The beams 16 and 18 are directed to an optical amplifier 24 by a beam director, preferably a pair of lenses 26 and 28. The focal lengths of lenses 26 and 28 and their positions relative to wedge 14 and amplifier 24 are preferably chosen so that the plane in which the exit face of wedge 14 lies is imaged onto the input face 27 of amplifier 24. The amplifier 24 is preferably a "zig-zag" slab amplifier made from neodymium-doped glass (Nd:glass). However, any other gain medium can be used as long as it does not depolarize beams 16 and 18. Examples of other possible gain media include Nd:YAG, a semiconductor such as gallium arsenide, a gas such as carbon dioxide, and a liquid containing a fluorescent dye such as rhodamine 6G.

"Zig-zag" slab amplifiers are well known in the art and are described in J. M. Eggleston, et al., "Slab-Geometry Nd:glass Laser Performance Studies", *Optics Letters*, vol. 7, no. 9, May 1982, pages 405–407 and in the M. E. Brodov article cited above. The slab amplifier 24 should have a height-to-width aspect ratio large enough to avoid stress-induced depolarization of beams 16 and 18 through most of the aperture. In the preferred embodiment, an aspect ratio of between approximately 5:1 and 10:1 is used and Beams 16 and 18 are preferably directed so that they reflect off the lateral surfaces of the amplifier 24 by total internal reflection, as illustrated in FIG. 2. For ease of illustration, beams 16 and 18 are not drawn to scale. In actual practice, beams 16 and 18 preferably fill approximately 80–90% of the aperture height of the amplifier 24. This reduces the likelihood of depolarization that would otherwise occur if the full aperture were utilized.

Referring back to FIG. 1a, beams 16 and 18 perform a first pass through amplifier 24 and reflect off mirrors 30 and 32, which direct each beam back along the path of the other beam. A lens 34 is used to image each beam back into the amplifier 24. The focal length and position of lens are preferably chosen so that the exit face 36 of amplifier 24 is imaged onto itself.

For illustration, FIG. 1a shows beams 16 and 18 making the same number of bounces in the amplifier 24. However, optical paths in which beams 16 and 18 make different numbers of bounces during a single pass through the amplifier 24 are also possible, and fall within the scope of the invention.

In FIG. 1b, the re-directed beams 16 and 18 perform a second pass through the amplifier 24, with each beam retracing the other beam's first path through amplifier as well as the other beam's first path through lenses 26 and 28 and wedge 14. The path exchange between beams 16 and causes them to continue to diverge when they pass back through wedge 14, rather than to recombine into a single depolarized beam. The beams are directed by mirrors 38 and 40 to lens 42, which focuses the beams into a phase conjugator The type of phase conjugator 44 used will generally depend upon the system's power requirements. For amplification of continuous wave optical beams or of relatively low peak power pulsed beams with pulse durations that are relatively long (for example 100–200 Watts peak power and 1 ms pulse durations), a long liquid-filled capillary can be used, such as that described in Belan et al., "Stimulated Brillouin Scattering Mirrors made of Capillary Waveguides", *Soviet Journal of Quantum Electronics*, vol. 17, no. 1, Jan. 1987, pages 122–124. For higher peak powers but shorter pulse durations, such as 10 MW over 10 ns, the phase conjugator can operate by stimulated Brillouin scattering (SBS) in a bulk medium or in a larger-area, short length lightguide. Representative phase conjugators are described in N. G. Basov, et al., "Inversion of Wavefront in SMBS of a Depolarized Pump", *JETP Letters*, vol. 28, no. 4, Aug. 1978, pages 197–201, and Andreev et al., "Locked Phase Conjugation for Two-Beam Coupling of Pulse Repetition Rate Solid State Lasers", *IEEE Journal of Quantum Electronics*, vol. 27, no. 1, January 1991, pages 135–141.

The present system preferably utilizes a scheme disclosed by Basov et al. for conjugating depolarized beams. Specifically, a 90 degree polarization rotator 46 is used to rotate the polarization of either beam 16 or 18 (the polarization of beam 18 is rotated for illustration), so that their polarizations are parallel with respect to each other in the phase conjugator 44.

The phase conjugator 44 phase conjugates and retroreflects beams 16 and 18 so that they retrace their paths through the system, as illustrated in FIG. 1c. Beam 18 passes back through polarization rotator 46 so that its polarization is once again orthogonal with respect to the polarization of beam 16. The beams perform a third pass through amplifier 24 and their paths are again exchanged by mirrors 30 and In FIG. 1d, the beams 16 and 18 perform a fourth pass through amplifier 24 and converge on the birefringent wedge 14. Since beams 16 and 18 now have the same incident angles and polarizations that they had following the first pass through the wedge 14, they are recombined into a single return beam 48. The phase conjugator 44 alters the wavefronts of beams 16 and 18 after their second pass through amplifier 24 so that, on their third and fourth passes through the system, any wavefront aberrations imparted by the amplifier and optics during the first and second passes are compensated. As a result, the recombined return beam 48 has substantially the reversed wavefront and random polarization as the original beam Although a four-pass system is illustrated as a preferred amplifier system, the system may be adapted to perform more than four passes without departing from the scope of the invention. For example, the first set of multiple passes may comprise first, second, third and fourth passes through the amplifier 24, with the path exchange imposed after the second pass. The beams would then be phase conjugated so that they retrace their paths through the amplifier and perform fifth, sixth, seventh and eighth passes through the amplifier 24 before being recombined into a single return beam 48.

A high-power phase conjugate laser system that utilizes the present amplifier system 10 is illustrated in FIG. 3. An optical beam generator, such as a laser 50, is used to generate a diffraction-limited and linearly polarized seed beam 52. For illustration purposes, the seed beam is assumed to be vertically polarized (into the page). A polarizing beamsplitter 53 reflects the vertically polarized seed beam 52 towards a non-reciprocal polarization rotator, preferably a Faraday polarization rotator 54, that rotates the polarization of the seed beam by +45 degrees. The polarization-rotated seed beam 55 is transmitted to the amplifier system 10 by a beam delivery system, preferably an optical fiber 56 that is multimode with respect to the seed beam 55. The fiber 56 severely aberrates and depolarizes the transmitted seed beam 58. The aberrated and depolarized seed beam 58 enters the amplifier system 10, where it is amplified and phase conjugated as described above.

The amplified and phase conjugated return beam 60 from the amplifier system is transmitted back along fiber 56. Since the return beam 60 is phase conjugated, the aberrations and depolarization imparted on it during its first pass through fiber 56 are compensated on its return pass. As a result, the compensated return beam 62 emitted from fiber 56 has substantially the same diffraction-limited wavefront as the seed beam 55 that was initially launched into fiber 56. The compensated return beam 62 is also once again linearly polarized. However, since the Faraday rotator 54 is a non-reciprocal optical element, it rotates the polarization of the compensated return beam 62 by another ±45 degrees, making the return beam's polarization horizontal (in the plane of the page). The now horizontally polarized and amplified return beam 64 is coupled out of the system as a useful output bypassing it through the polarizing beamsplitter While several illustrative embodiments of the invention have been shown and described, numerous variations and alternate embodiments will occur to those skilled in the art. For example, although a single multi-mode fiber is shown in FIG. 3, a multi-mode fiber bundle, or any other optical beam delivery system that is capable of transmitting the high power amplified return beam may be used. In addition, although only one optical amplifier is illustrated in FIGS. 1a–1d, two or more optical amplifiers arranged in series may also be used. Such variations and alternate embodiments are contemplated, and can be made without departing from the spirit and scope of the appended claims.

I claim:

1. A system for amplifying and wavefront compensating a depolarized optical seed beam, comprising:
   a polarizing beamsplitter for splitting said depolarized optical seed beam into two orthogonally polarized beams,
   at least one optical amplifier for amplifying said orthogonally polarized beams,
   at least one beam director for directing and redirecting said beams back into said at least one amplifier so that they perform a first set of multiple passes through said amplifier, and
   a phase conjugation unit for phase conjugating said beams after said first set of multiple passes so that the phase conjugated beams counter-propagate back to said at least one amplifier, perform a second set of multiple passes through said amplifier, and are recombined into a single return beam by said polarizing beamsplitter,
   said phase conjugation unit altering the wavefronts of said orthogonally polarized beams so that wavefront and polarization of said return beam substantially matches the wavefront and polarization of said seed beam.

2. The system of claim 1, wherein said first set of multiple passes comprises first and second passes through said at least one amplifier, and said second set of multiple passes comprises third and fourth passes through said at least one amplifier.

3. The system of claim 2, wherein said at least one beam director comprises:
   a first beam director for directing said orthogonally polarized beams to said at least one amplifier so that said beams perform said first pass through said amplifier, and
   a second beam director for re-directing said beams back into said at least one amplifier after said beams have performed said first pass, so that they perform said second pass through said amplifier,
   said second beam director re-directing said beams back into said at least one amplifier after said first pass so that each of said beams perform said second pass through said amplifier by propagating back along the other beam's first path, each of said beams also retracing the other beam's first path through said first beam director and to said polarizing beamsplitter, thereby causing said beams to diverge from each other after passing back through said polarizing beamsplitter.

4. The system of claim 3, wherein said second beam director re-directs said beams after said third pass so that each of said beams performs said fourth pass through said at least one amplifier by propagating back along the other beam's third path through said amplifier.

5. The system of claim 1, wherein said phase conjugation unit comprises:
   a Stimulated Brillouin Scattering (SBS) phase conjugator for phase conjugating said beams after said first set of multiple passes, and
   a polarization rotator for rotating the polarization of one of said beams by 90 degrees so that said beams have the same polarization at said conjugator, said polarization rotator rotating the polarization of said one beam by another 90 degrees after phase conjugation by said conjugator so that its polarization is again orthogonal to the other beam's polarization.

6. The system of claim 1, wherein said polarizing beamsplitter comprises a birefringent wedge.

7. The system of claim 1, wherein said at least one optical beam amplifier comprises an Nd:glass or Nd:YAG slab amplifier.

8. A high power phase conjugate optical system, comprising:
   an optical beam generator for generating a linearly polarized optical seed beam,
   a beam delivery system for delivering said seed beam to a predetermined location, said beam delivery system depolarizing said seed beam,
   a first polarizing beamsplitter for splitting said depolarized seed beam into two orthogonally polarized beams,
   at least one optical beam amplifier for amplifying said orthogonally polarized beams,
   at least one beam director for directing and redirecting said beams into said at least one amplifier so that they perform a first set of multiple passes through said amplifier, and
   a phase conjugation unit for phase conjugating said beams after said first set of multiple passes so that the phase conjugated beams counter-propagate back to said at least one amplifier, perform a second set of multiple passes through said amplifier, and are recombined into a single return beam by said polarizing beamsplitter,
   said phase conjugation unit altering the wavefronts of said orthogonally polarized beams so that wavefront and polarization of said return beam substantially matches the wavefront and polarization of said seed beam.

9. The system of claim 8, wherein said first set of multiple passes comprises first and second passes through said at least one amplifier, and said second set of multiple passes comprises third and fourth passes through said at least one amplifier.

10. The system of claim 9, wherein said at least one beam director comprises:
    a first beam director for directing said orthogonally polarized beams to said at least one amplifier so that said beams perform said first pass through said amplifier, and
    a second beam director for re-directing said beams back into said at least one amplifier after said beams have performed said first pass, so that they perform said second pass through said amplifier.

11. The system of claim 10, wherein said second beam director re-directs said beams back into said at least one amplifier after said first pass so that each of said beams perform said second pass through said amplifier by propagating back along the other beam's first path through said amplifier, each of said beams also retracing the other beam's first path through said first beam director and to said polarizing beamsplitter, thereby causing said beams to diverge from each other after passing back through said polarizing beamsplitter.

12. The system of claim 11, wherein said second beam director re-directs said beams after said third pass so that each of said beams performs said fourth pass through said at least one amplifier by propagating back along the other beam's third path through said amplifier.

13. The system of claim 8, further comprising an input/output coupler for coupling said seed beam into said beam delivery system and coupling said return beam out of said beam delivery system.

14. The system of claim 13, wherein said optical beam generator comprises a laser for generating a linearly polarized, diffraction-limited optical seed beam, and said input/output coupler comprises:
    a second polarizing beamsplitter for transmitting radiation with one linear polarization component and reflecting radiation with an orthogonal polarization component, said beamsplitter directing said linearly polarized seed beam to said beam delivery system, and
    a non-reciprocal polarization rotator positioned between said second polarizing beamsplitter and said beam delivery system for rotating the polarizations of said seed and return beams by 45 degrees so that said return beam is orthogonally polarized with respect to said seed beam at said second polarizing beamsplitter.

15. The system of claim 14, wherein said non-reciprocal polarization rotator comprises a Faraday rotator.

16. The system of claim 8, wherein said beam delivery system comprises an optical fiber that is multi-mode with respect to said seed beam.

17. The system of claim 8, wherein said beam delivery system comprises a bundle of optical fibers that are multi-mode with respect to said seed beam.

18. The system of claim 8, wherein said phase conjugation unit comprises:
    a Stimulated Brillouin Scattering (SBS) phase conjugator for phase conjugating said beams after said first set of multiple passes, and
    a polarization rotator for rotating the polarization of one of said beams by 90 degrees so that said beams have the same polarization at said conjugator, said polarization rotator rotating the polarization of said one beam by another 90 degrees after phase conjugation by said conjugator so that its polarization is orthogonal to the other beam's polarization.

19. The system of claim 8, wherein said first polarizing beamsplitter comprises a birefringent wedge.

20. The system of claim 8, wherein said optical beam amplifier comprises an Nd:glass or Nd:YAG slab amplifier.

21. A method for amplifying and wavefront compensating a depolarized optical seed beam, comprising the steps of:
    dividing said seed beam into two orthogonally polarized components,
    amplifying said components,
    removing aberrations imposed on said components by said amplification, and
    recombining said polarized components into a single output beam.

22. The method of claim 21, wherein said components are amplified by making a plurality of amplification passes through at least one amplifier.

23. The method of claim 22, wherein said aberrations are removed by phase conjugating said components.

24. The method of claim 23, wherein said plurality of amplification passes comprise a first and second set of multiple amplification passes and said components are phase conjugated after said first set of multiple amplification passes through said at least one amplifier.

25. A method for amplifying and wavefront compensating a depolarized optical seed beam, comprising the steps of:

splitting said depolarized seed beam into two orthogonally polarized beams, amplifying said orthogonally polarized beams in a first set of amplification passes through at least one amplifier, phase conjugating said beams after said first set of amplification passes, further amplifying said beams in a second set of amplification passes through said at least one amplifier, and recombining said beams into a single return beam after said second set of amplification passes, said phase conjugation altering the wavefronts of said orthogonally polarized beams so that the wavefront of said return beam substantially matches the wavefront of said seed beam.

26. The method of claim 25, wherein said first set of amplification passes comprise first and second amplification passes and said second set of amplification passes comprise third and fourth amplification passes.

27. The method of claim 26, wherein each of said beams performs said second amplification pass by propagating back along the other beam's first amplification path.

28. The method of claim 27, wherein each of said beams performs said third amplification pass by propagating back along their own second amplification path.

29. The method of claim 28, wherein each of said beams performs said fourth amplification pass by propagating back along the other beam's third amplification path.

30. The method of claim 26, wherein said phase conjugation retro-reflects said beams to said at least one amplifier.

31. The method of claim 25, wherein said beams are phase conjugated by:

rotating the polarization of one of said beams by 90 degrees so that said beams have the same polarization, directing said beams into a phase conjugator, and rotating the polarization of said one beam by another 90 degrees after phase conjugation so that its polarization is again orthogonal to the other beam's polarization.

* * * * *